United States Patent [19]

Kukovich, Jr.

[11] Patent Number: 4,867,075

[45] Date of Patent: Sep. 19, 1989

[54] SHIFTABLE TRUCK BED

[76] Inventor: Charlie Kukovich, Jr., R.R. 1, Box 62A, Mulberry, Kans. 66756

[21] Appl. No.: 271,051

[22] Filed: Nov. 14, 1988

Related U.S. Application Data

[63] Continuation of Ser. No. 112,684, Oct. 23, 1987.

[51] Int. Cl.$^4$ ............................................. B65G 67/02
[52] U.S. Cl. ..................................... 108/137; 414/522
[58] Field of Search ......................... 108/137; 414/522

[56] References Cited

U.S. PATENT DOCUMENTS

| | | | |
|---|---|---|---|
| 2,091,068 | 8/1937 | Girl | 414/522 |
| 3,471,045 | 10/1969 | Panciocco | 414/522 |
| 3,717,268 | 2/1973 | Snodgrass | 414/522 |
| 3,768,673 | 10/1973 | Nydam et al. | 414/522 |
| 3,856,168 | 12/1974 | Mauck | 414/522 X |
| 4,681,360 | 7/1987 | Peters et al. | 414/522 X |
| 4,685,857 | 8/1987 | Goeser et al. | 414/522 |

Primary Examiner—Peter A. Aschenbrenner
Attorney, Agent, or Firm—Michael Yakimo, Jr.

[57] ABSTRACT

A slidable loading platform for a vehicle comprising a bed slidably mounted atop a truck array. A plurality of roller assemblies associated with the track and with the bed enhances a slidable movement of the platform relative to the track array. A locking mechanism precludes undesirable shifting of the bed during vehicle transport and unloading.

2 Claims, 2 Drawing Sheets

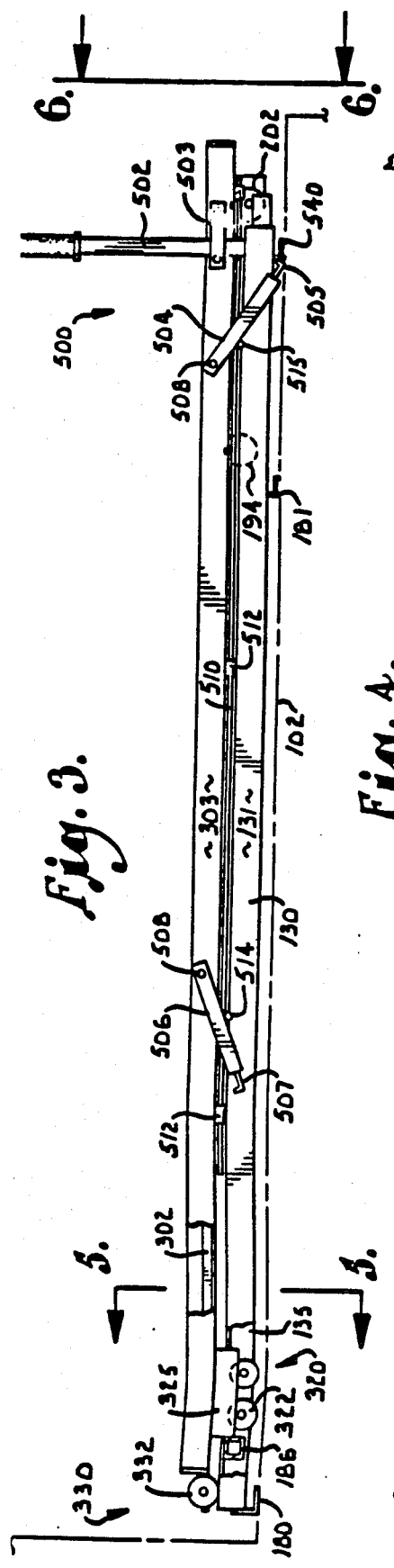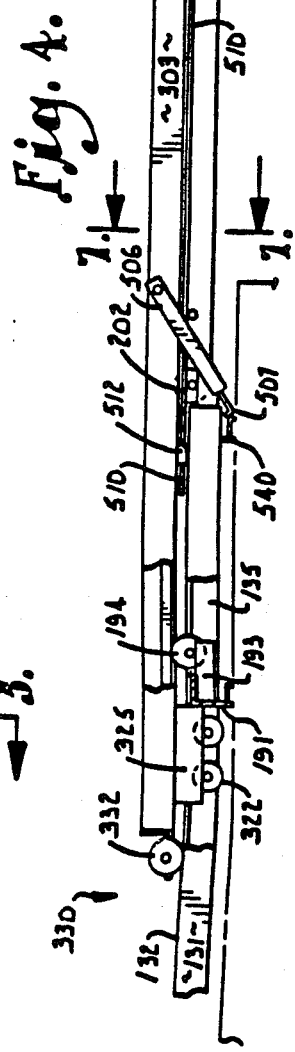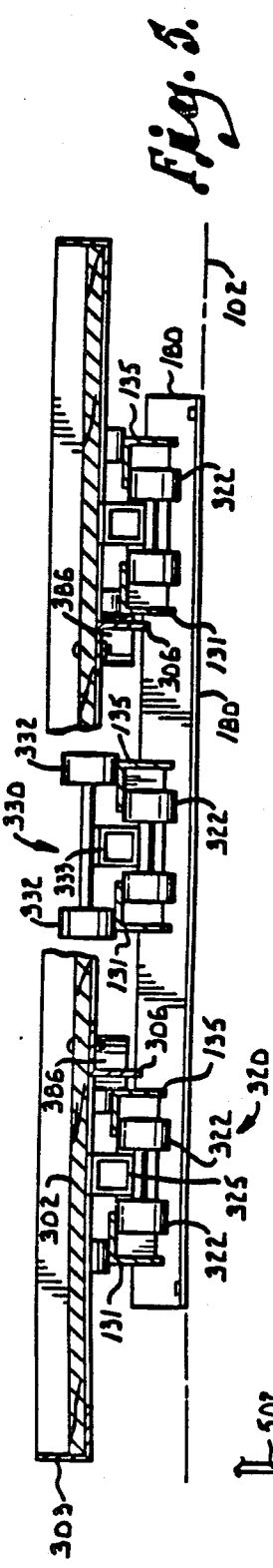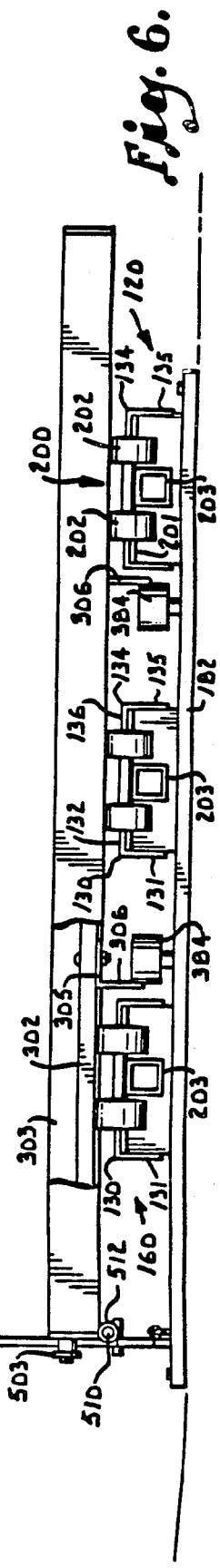

SHIFTABLE TRUCK BED

This application is a continuation of application Ser. No. 112,684, filed 10/23/87.

BACKGROUND OF THE INVENTION

This invention relates to a loading platform, and more particularly, to a platform assembly slidably mounted within a truck bed so as to enhance the loading, accessibility and unloading of truck equipment and/or cargo.

One problem that has arisen in the use of pickup trucks, flat bed trucks, vans and the like is that the loading and unloading of equipment or cargo from the truck bed can be relatively difficult due to the configuration of the truck bed and, if present, the surrounding sidewalls. Previously these functions, particularly as to heavy cargo, required the user to lift the cargo onto the truck bed at the rear end thereof and then carry the cargo to the proper location within the bed confines for transport. Upon unloading, the user had to enter the confines of the truck bed and carry the cargo to the rear thereof. In either case the cargo may have been dragged across the truck bed and marred the same. In other cases it may be desirable to have access to tools or other equipment stored on the bed. At times it may be necessary to enter the confines of the truck bed so as to facilitate access to such equipment. Accordingly it is desirable to have a truck bed which facilitates the loading and unloading of cargo from the confines of a truck bed as well as allows easy access to the cargo or equipment stored thereon.

In response thereto I have invented a truck bed in the form of a shiftable loading platform assembly which is slidably mounted relative to the confines of the original truck bed. The platform is mounted atop a track system so as to restrain the longitudinal and lateral movement of the slidable platform within the confines of the truck bed. The platform/track combination provides easy, user-activated movement of the platform and cargo or equipment thereon to more accessible positions within and without the confines of the truck bed.

I have also provided a locking mechanism associated with the slidable platform so as to maintain the slidable platform in place during vehicle transport as well as in a longitudinally shifted position. Accordingly cargo or equipment supported atop this slidable platform can be longitudinally displaced relative to the original truck bed, so as to facilitate loading, unloading and access thereto. I have found that my assembly is adaptable for use with various types of transport vehicles as well as in static applications such as on a loading dock or the like.

It is therefore a general object of this invention to provide a slidable loading platform assembly for storage of equipment/cargo thereon so as to facilitate displacement of the equipment/cargo as well as access thereto.

Another object of this invention is to provide apparatus, as aforesaid, which utilizes a track system/platform combination so as to define the direction of longitudinal movement of the slideable platform as well as restrain the lateral movement of the same.

Still another object of this invention is to provide apparatus, as aforesaid, which displaces equipment/cargo from within the confines of a truck bed to a position without the confines thereof so as to facilitate loading, unloading and access to said equipment/cargo.

Another particular object of this invention is to provide apparatus, as aforesaid, which has a locking mechanism thereon so as to maintain the slidable platform in place relative to the track system and truck bed.

A still further object of this invention is to provide apparatus, as aforesaid, which utilizes a plurality of roller assemblies therein to enhance longitudinal movement of the slidable platform and delimit any undesirable lateral movement thereof.

Another particular object of this invention is to provide apparatus, as aforesaid, which utilizes roller assemblies between the track system and platform to enhance relative movement therebetween.

Other objects and advantages of this invention will become apparent from a reading of the specification, inspection of the drawings and claims herein as a whole.

BRIEF DESCRIPTION OF THE DRAWINGS

FIG. 3 is a side elevation view illustrating the track/platform combination and associated locking mechanism with a portion of a track rail broken away to show the lower platform roller assembly and a portion of the platform sidewall broken away to show the storage bed.

FIG. 4 is a side elevation view, similar to that in FIG. 3, illustrating a preferred maximum displacement of the slidable platform relative to the proximal or loading end of the truck and in a locked position.

FIG. 5 is a sectional view, taken along line 5—5 in FIG. 3 and on an enlarged scale, illustrating the cooperation of the platform roller, assemblies with the track and the guide roller assembly.

FIG. 6 is an end view taken along line 6—6 in FIG. 3 and on an enlarged scale, illustrating the cooperation of the slidable platform with the roller assemblies of the track system therebelow.

DESCRIPTION OF THE PREFERRED EMBODIMENT

Figure 7:
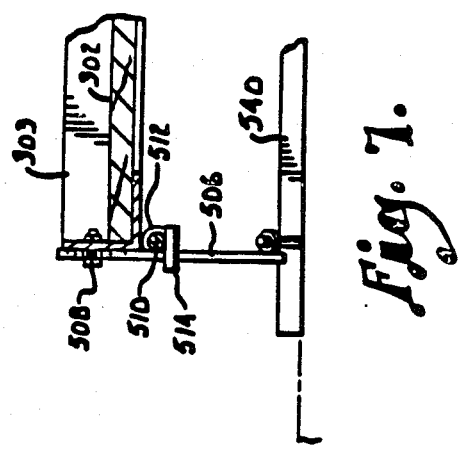
FIG. 7 is a sectional elevation view, taken along line 7—7 in FIG. 4, illustrating the relationship of the distal locking arm, linkage and bar stop of the locking mechanism.
Figure 1:
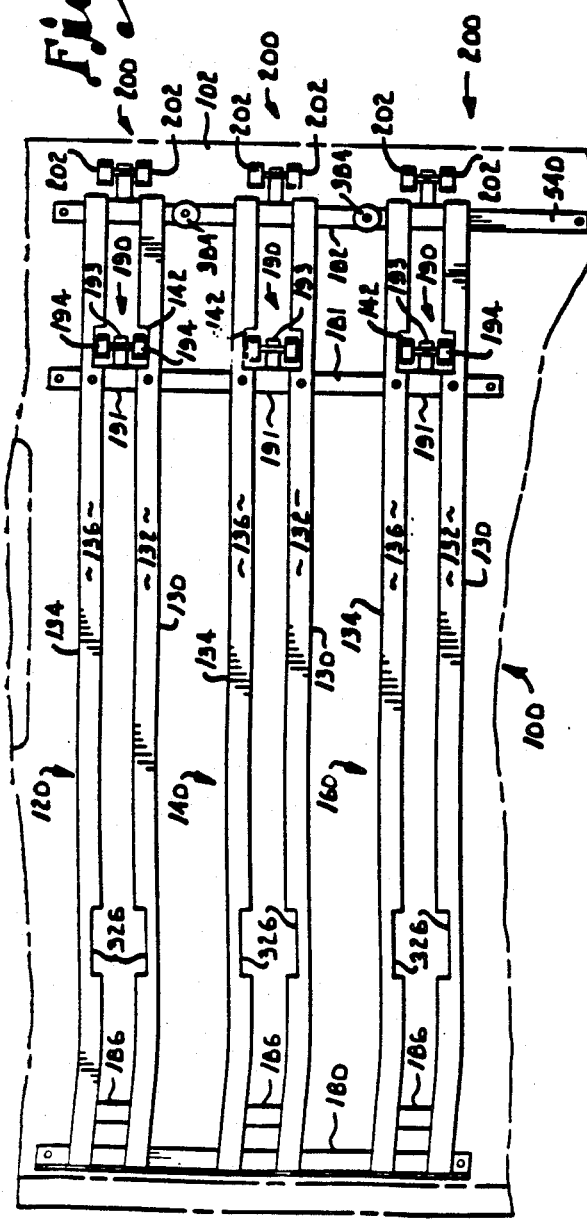
FIG. 1 is a top plan view illustrating the track system and its roller assemblies mounted on an underlying surface.
Figure 2:
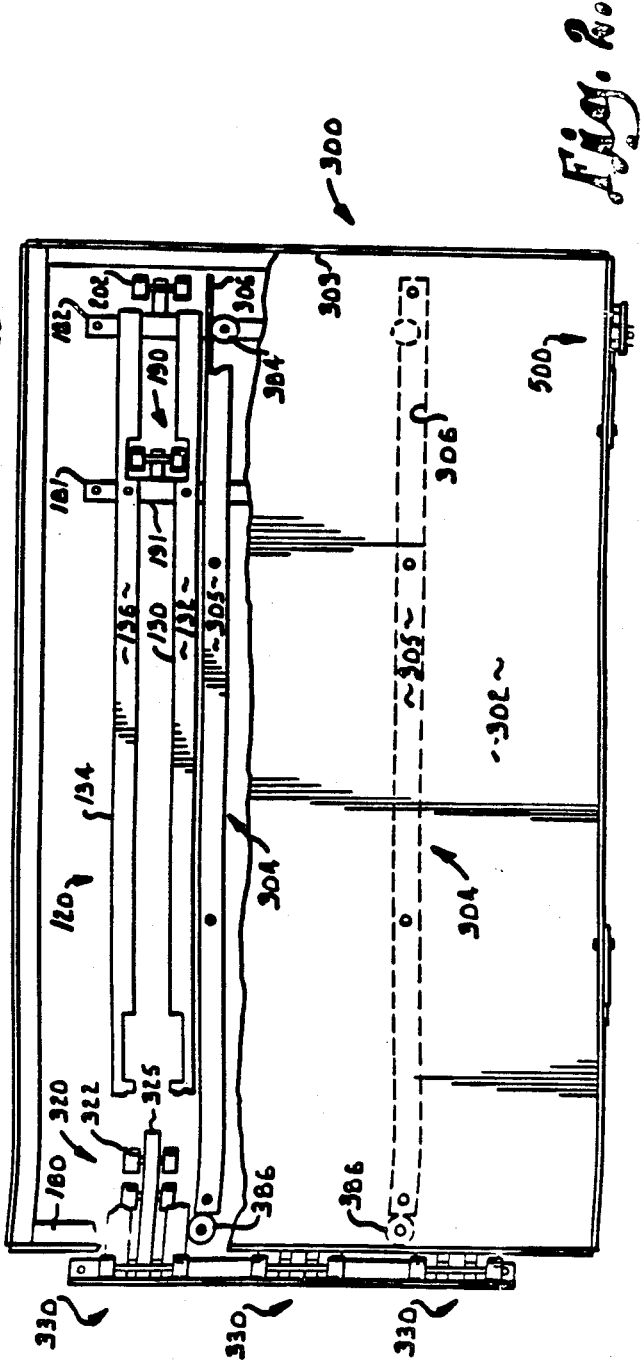
FIG. 2 is a plan view, similar to that of FIG. illustrating the slidable platform atop the tracks with a portion of the platform broken away to illustrate the track system therebelow and with a portion of a track broken away to illustrate the lower roller assembly of the slidable platform.

Turning more particularly to the drawings (FIGS. 1-7), FIG. illustrates the lower track assembly 100 mounted atop a horizontal surface 102 such as presented by a truck bed, loading platform or the like. It is understood that this horizontal surface 102 may be a separate element that is releasably positioned atop the truck bed when the platform assembly is to be used. As such the assembly 102 comprises three laterally spaced apart assemblies 120, 140, 160 mounted atop laterally extending mounting bars. These mounting bars 180, 181, 182 are longitudinally spaced along the extent of the horizontal surface or truck bed 102. Each track is defined by first and second rail members 130, 134 with each rail comprising a vertically upstanding wall 131, 135 and an inwardly extending, horizontal top wall 132, 136. A spacer 186 extends between the opposed vertical walls 131, 135 of each track towards the rear end thereof and functions as a stop for the roller assembly 320 to be subsequently described.

Mounted towards the front or proximal end of each track 120, 140, 160 is a roller assembly 190 having a pair of laterally spaced-apart rollers 194 partially extending above the horizontal top walls 132, 136 of the rails 130, 134 as provided by notches 142 cut therein. The assembly 190 is mounted to the respective rail pairs 130, 134 by means of a mounting bar 191 connected to the underside of the top rail walls 132, 136 with a roller axle bar 193 extending therefrom. A second roller assembly 200 extending beyond the proximal end of the tracks 120, 140, 160 presents a pair of laterally spaced-apart rollers 202 which are in general alignment with rollers 194. The assembly 200 is mounted to the respective rail pairs 130, 134 by means of a mounting bar 201 connected to the underside of the top walls 132, 136 with a roller axle bar 203 normally extending therefrom.

The platform assembly 300 generally comprises a horizontal planar bed 302 having an upstanding peripheral wall 303. A pair of longitudinally extending guide flanges 304 are mounted on the underside thereof. Each flange 304, which also reinforces the horizontal bed 302, comprises a horizontal top wall 305 connected to the underside of the bed 302 and a depending vertical wall 306.

Mounted towards the far or distal end of the platform 302 are three laterally spaced apart roller assemblies 320. Each roller assembly comprises four rollers 322 rotatably mounted to a axle bar 325 attached to the underside of the bed 302. This axle bar 325 is of a width less than the space between the opposed, spaced-apart top walls 132, 136. Entry of the lower roller assembly 320 beneath the respective rails 130, 134 is provided by notches 326 in each rail wall 132, 134 towards the distal portion thereof. As shown in FIG. 5 the roller assembly 320 is designed for rolling movement through the channel created by the opposed rails 130, 134 i.e. underneath the horizontal top walls 132, 136 and adjacent the vertical walls 131, 135.

Mounted at the extreme distal end of the platform 302 are three roller assemblies 330. Each assembly comprises a pair of rollers 332 mounted to an axle bar 333 which in turn is mounted to the end sidewall 302 via flange 335 (FIG. 4). The distal roller assembly 33 is designed for rolling movement of the rollers 332 atop the horizontal wall 132, 136 of the respective opposed rails 130, 134.

Upwardly extending from the mounting bar 182 at the proximal end of the respective tracks 120, 140, 160 are a pair of proximal 384 guide rollers. Each guide roller 384 is designed for rolling movement along the vertical depending wall 306 of the adjacent guide flange 304 upon placement of the platform 300 atop the tracks. A pair of depending distal guide rollers 386 is attached to the platform bed 302 and is designed for rolling movement along the depending vertical walls 131, 135 of the adjacent rails 130, 134. These relationships preclude undesirable lateral movement of the bed 302 during its longitudinal slidable movement.

A locking mechanism generally designed as 500 is illustrated in FIGS. 3, 4 and 7. The assembly 500 comprises an upstanding handle 502 mounted to the peripheral side wall 303 of the platform 300 via a flange 503. The assembly 500 further comprises a proximal 504 and distal 506 locking arm having lugs 505, 507 projecting from the lower end thereof. Each arm 504, 506 is pivotally mounted to the sidewall 303 of the platform 302 about a pivot pin 508 extending therethrough. Extending through the lower end of the handle 502 and along the extent of the bed 302 is a linkage bar 510. The bar 510 extends through a plurality of guides 512 which are attached to the underside of the platform bed along the lateral edge thereof. An extension 540 of bar 182 acts as a bar stop which is designed to engage the projecting lugs 505, 507 of each locking arm 504, 506 in a manner as to be subsequently described.

In operation the normal mode of the locking mechanism 500 with the platform 300 in the transport position is shown in FIG. 3. As such the platform 302 is in general vertical alignment with the underlying tracks 120, 140, 160 such that the distal roller assembly 330 is at the extreme distal end of such tracks. In this position the locking lug 505 of arm 504 abuts the bar stop 540 which precludes an undesirable shifting of the bed 302 to the rear or proximal end of the vehicle during vehicle movement. Concurrently the axle bar 325 of the roller assembly 320 bears against the previously described spacer 186 so as to preclude longitudinal movement of the bed in the opposed distal direction during vehicle movement. Also the contact of the rollers 384, 386 with the depending walls 306 of the guide flange 304 and the adjacent rail walls 131, 135 delimits lateral movement of the bed 302 during vehicle transport. Upon arrival at the unloading site the handle 502 is pulled toward the user such that linkage bar 510 moves towards the proximal end of the vehicle causing lug 515 to bear against the locking arm 504. This lug 515 contact rotates arm 504 in a counterclockwise direction, as viewed in FIG. 3, which displaces the locking lug 505 from the bar stop 186. This displacement allows for sliding, rolling movement of the bed 302 by the user towards the rear of the truck. Concurrently the locking lug 514 is shifted away from its FIG. 3 position so that the locking arm 506 rotates in a counterclockwise direction. Upon such rotation the locking lug 507 of arm 506 drops to a position adjacent the surface 102 such that displacement of the fully shifted platform 302 (FIG. 4) in an opposed distal direction is inhibited by contact of lug 507 with the bar stop 540. It is noted that any further opposed proximal shifting of the bed 302 is inhibited by contact of the axle 325 with the mounting flange 191 of roller assembly 190. These relationships preclude undesirable longitudinal movement of the bed during loading and unloading of equipment from the bed 302. Although only one bar stop 540 has been shown, it is understood that a plurality of longitudinally spaced bar stops can be used so as to maintain the bed at various longitudinal positions relative to the track system therebelow.

Upon movement of handle 502 towards the distal end, the linkage bar 510 causes lug 514 to bear against locking arm 506 and rotate the same in a clockwise position. This rotation displaces the lug 507 from the bar stop 540 (FIG. 4) to allow the platform 302 to be shifted from its FIG. 4 unloading position to its FIG. 3 transport position. Concurrently lug 515 is released from arm 504 which allows arm 504 to rotate to a locking position as shown in FIG. 3.

As above described, movement of the platform 302 in either direction is enhanced by the cooperation of the roller assemblies 320, 330 of the platform 302 along the respective rails 130, 134 as well as the roller assemblies 190, 200 of the tracks 202 with the underside of the bed 302. As such the underside of the bed 302 is in rolling contact with the rollers 194, 202 and the opposed sides of the top surfaces 132, 136 of the rails as provided by rollers 322, 332. Thus there is no sliding friction between any elements of the assembly 100. The capture of the roller assembly 320 within the channel formed by the rails 130, 134, along with guide rollers 394, 386, precludes any undesirable movement of the bed 302 during its shiftable displacement. These relationships coupled with the above described locking assembly 500 assures the user that the bed 302 is maintained in a desired position during its various positions.

Although only one now preferred form of this invention has been shown herein it is understood that such invention should not be restricted to this preferred form except as set forth in the claims and the functional equivalents thereof. It also is understood that although this assembly has been discussed in relation to a vehicle that the assembly 100 may be used in applications other than a vehicle mode.

What I claim is:

1. For use with a platform presenting a load supporting surface, said platform being mounted in slidable movement along an underlying track which extends along a lower surface and defines a course of said platform slidable movement, a locking assembly on said platform for stopping said slidable movement along said track comprising:
    a first stop bar mounted in generally transverse extension across said track;
    a first locking arm having a free end and mounted on said platform in movement therewith;
    means for rotatably mounting said first arm to said platform in generally rotatable movement about an axis extending therethrough;
    a handle longitudinally displaced from said first arm and mounted to said platform in movement in first and second opposed directions;
    a linkage bar extending between said handle and said first locking arm for coupling said movement of said handle to said rotatable arm, said handle movable in said first direction causing movement of said linkage bar in a direction to rotate said free end of said first locking arm into a position for contact with said first stop bar during said platform slidable movement in a first direction along said track to preclude further slidable movement of said locking arm and said platform along said track in said first direction beyond said first stop bar, said handle movable in said second opposed direction causing an opposed movement of said linkage bar in a direction to rotate said first locking arm free end out of contact with said first stop bar allowing slidable movement of said locking arm and said platform along said track in said first direction beyond said first stop bar.

2. The assembly as set forth in claim 1 further comprising:
    a second stop bar mounted in generally transverse extension across said track and displaced from said first stop bar; a second locking arm having a free end and mounted on said platform in movement therewith;
    means for rotatably mounting said second arm to said platform about an axis extending therethrough, said second arm being displaced from said second locking arm and said handle;
    said linkage bar extending between said handle and said first and second locking arms, said movement of said handle in said first direction causing said movement of said linkage bar in said first direction to rotate said first arm free end into said contact with said first stop bar and said second arm free end away from contact with said second stop bar to preclude said further movement of said platform along said track in said first direction beyond said first stop bar, said second arm being further rotated to a position to provide contact of said second arm with said second stop bar upon movement of said handle in said opposed second direction whereby to stop said slidable movement of said platform in a second direction along said track beyond said stop bar opposed to said first direction.

* * * * *

UNITED STATES PATENT AND TRADEMARK OFFICE
CERTIFICATE OF CORRECTION

PATENT NO. : 4,867,075
DATED : September 19, 1989
INVENTOR(S) : Charlie Kukovich, Jr.

It is certified that error appears in the above—identified patent and that said Letters Patent is hereby corrected as shown below:

In claim 2, column 6, line 16, make a new paragraph beginning with "a second locking arm" and ending with "therewith;"

Signed and Sealed this

First Day of January, 1991

Attest:

HARRY F. MANBECK, JR.

*Attesting Officer*     *Commissioner of Patents and Trademarks*